Dec. 8, 1964    G. E. DI CESARE    3,160,385
SUCTION VALVE FOR SINTERING MACHINE
Filed Sept. 21, 1961    10 Sheets-Sheet 1

FIG. 1

Dec. 8, 1964   G. E. DI CESARE   3,160,385
SUCTION VALVE FOR SINTERING MACHINE
Filed Sept. 21, 1961   10 Sheets-Sheet 3

Dec. 8, 1964    G. E. DI CESARE    3,160,385
SUCTION VALVE FOR SINTERING MACHINE
Filed Sept. 21, 1961    10 Sheets-Sheet 8

FIG. 13

United States Patent Office 3,160,385
Patented Dec. 8, 1964

3,160,385
SUCTION VALVE FOR SINTERING MACHINE
George E. Di Cesare, Springfield Gardens, N.Y., assignor to Greenawalt Sintering Co., Inc., New York, N.Y., a corporation of New York
Filed Sept. 21, 1961, Ser. No. 139,727
4 Claims. (Cl. 251—134)

This invention relates to the art of sintering ores and concentrates, and more particularly, to controlling the suction applied to the sintering machine.

In a well known type of sintering machine the material to be sintered is placed upon a grate with suitable fuel. The material is ignited by a suitable ignition device and suction is applied to a pan under the grate to sinter the material. The suction is obtained by large fans connected by a suitable suction pipe to the sintering pan. At certain times during the sintering cycle, it is desired to remove suction from the machine. This is done, for example, when charging the machine and when dumping the sintered charge from the grate. During these periods it is impractical to stop the huge suction fans so it is necessary to provide a suction valve between the suction fan and the sintering machine.

Objects of the invention are to provide a suction valve which will efficiently control the flow of gases from the sintering machine to the stack, in a simple and reliable manner.

According to one preferred form of the invention, the suction valve comprises a casing rectangular in cross-section; its upstanding side walls are provided with side pockets in which are disposed shafts, one on either side. A rectangular gate, of a size corresponding to approximately one-half of the cross-section of the valve casing, is hung on each shaft. These gates may be swung from a fully closed position, where they substantially completely obstruct the flow passage of the valve, to a full open position where they are located in the side pockets, well out of the main flow passage.

In said preferred form the valve gates are operated by a gear mechanism enclosed in a gear box on top of the valve casing. These gears are operated by a gear reducer located on top of the gear box, which is driven by an electric motor on top of the gear reducer.

In said preferred form suitable control devices are provided for operating the motor. The motor drives the valve gates between fully open and fully closed positions and holds the gates in these positions and in any intermediate position. Suitable limiting devices are provided to stop the motor when the gates have reached their full open or full closed position. Suitable signalling devices are provided to indicate to the operator at all times the position of the gates.

Other objects and features of the invention will be more apparent from the following description when considered with the following drawings in which.

In the following description and in the claims, various details will be identified by specific names for convenience, but they are intended to be as generic in their application as the art will permit.

Like reference characters denote like parts in the several figures of the drawings.

In the accompanying drawings and description forming part of this specification, certain specific disclosure of the invention is made for purposes of explanation, but it will be understood that the details may be modified in various respects without departure from the broad aspect of the invention.

Figure 1:
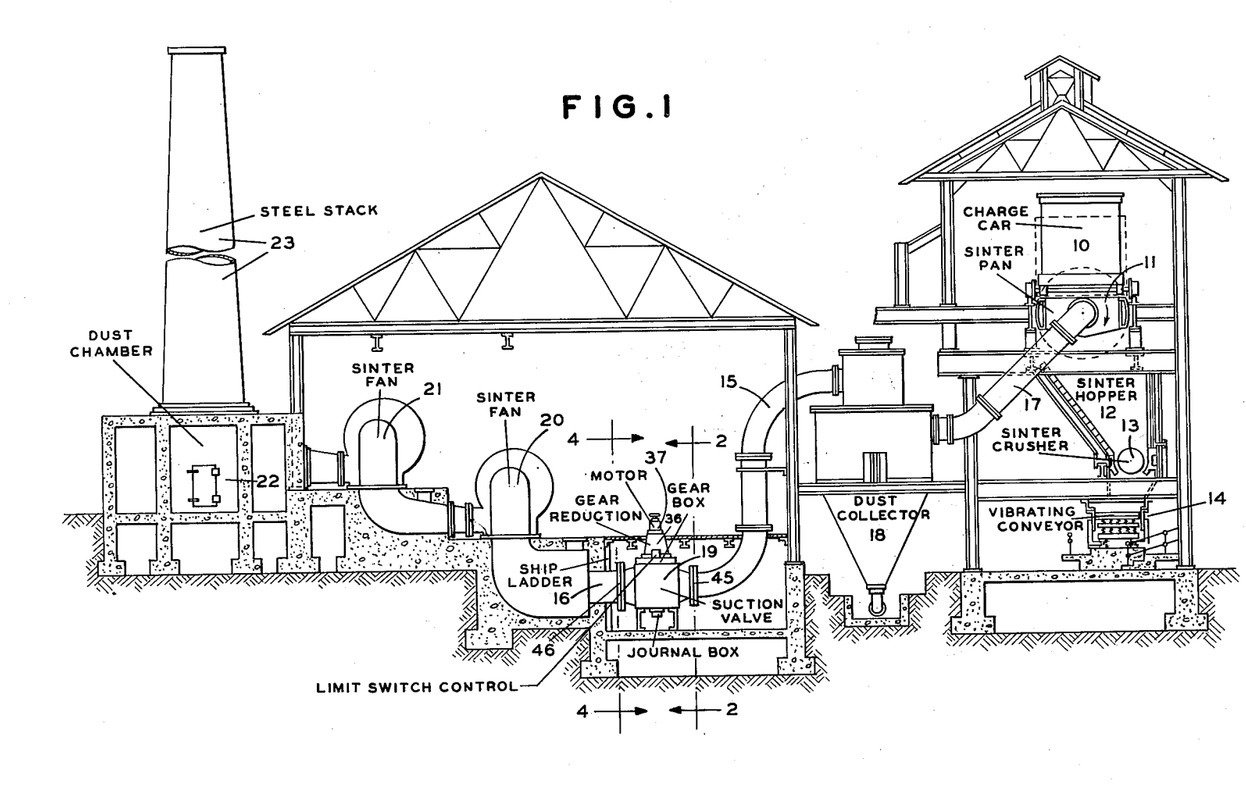
FIG. 1 is a sectional elevation of a typical sintering plant incorporating the invention.

Referring now to the drawings and more particularly to FIG. 1, a typical sintering plant utilizing the invention will be briefly described. The sintering machine comprises a charge car 10, running on a track disposed over sinter pan 11. Under the sinter pan is a hopper 12 for receiving the sintered material. At the bottom of hopper 12 is a sinter crusher 13 under which is disposed a conveyor 14.

For applying suction to the sinter pan 11, a suction pipe 17 leads to dust collector 18. A suction pipe 15 leads from dust collector 18 to suction valve 19. A suction pipe 16 leads from valve 19 to first fan 20. The output of first fan 20 leads to second fan 21 which delivers gas to dust chamber 22 under steel stack 23.

It will be understood that, after the sintering machine is charged with the material to be sintered, the material is ignited and the sinter fans 20 and 21 suck air downwardly through the charge and through the sinter pan 11. The sinter gases then pass through dust collector 18 and suction valve 19 to the fans which discharge the gases through dust chamber 22 to stack 23.

The suction valve 19 will first be only generally described after which it will be described more in detail.

As shown, particularly in FIG. 7, the valve comprises a casing indicated generally by 24, a pair of gates 25, 26, mounted on shafts 27, 28, journaled in the casing as described more in detail below. The full lines illustrate the gates in full closed position and the dotted lines indicate the gates in full open position.

Figure 2:
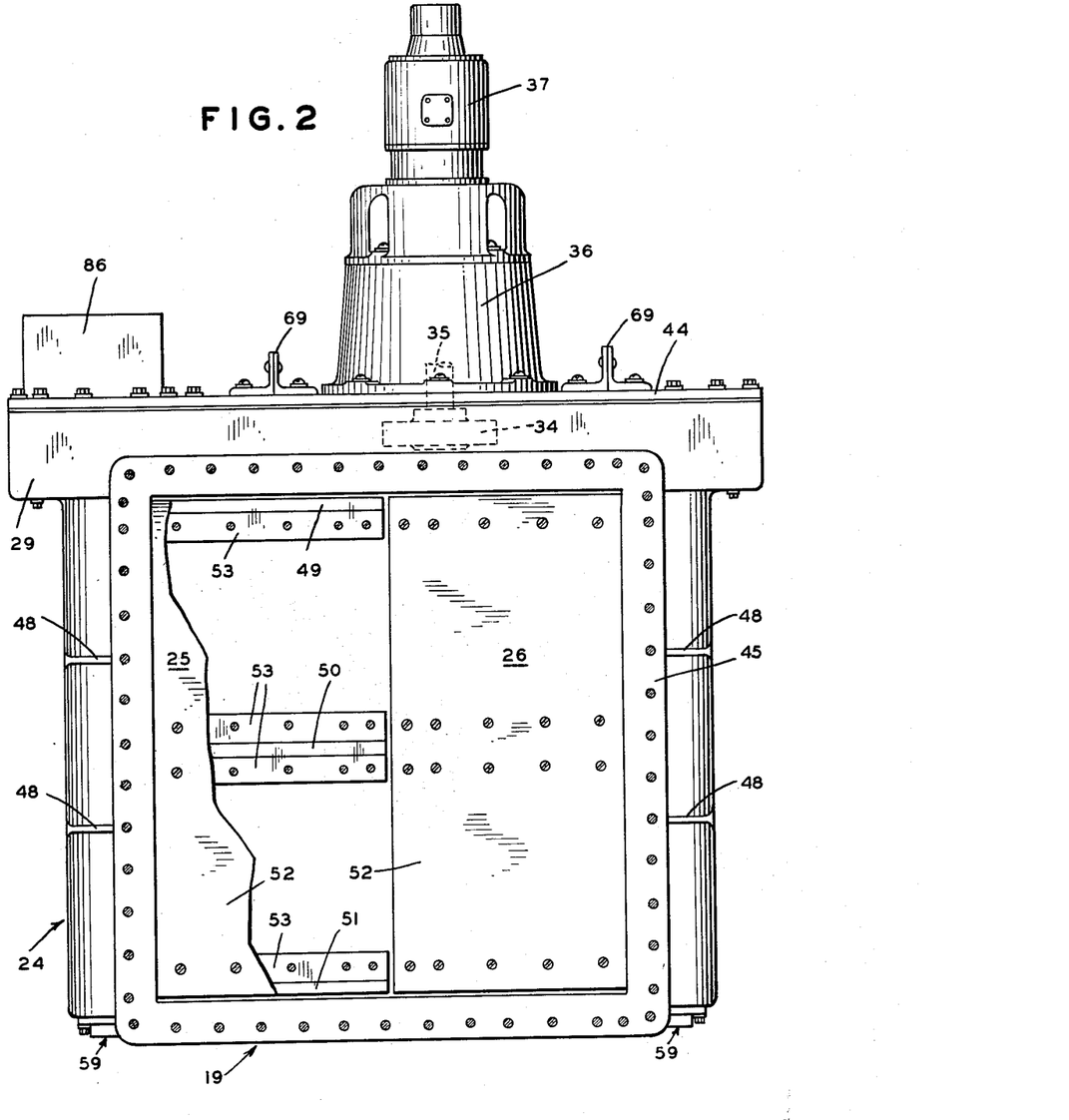
FIG. 2 is a vertical section, on the line 2—2 of FIG. 1, taken at the entrance side of the valve looking down stream toward the fans.
Figure 5:
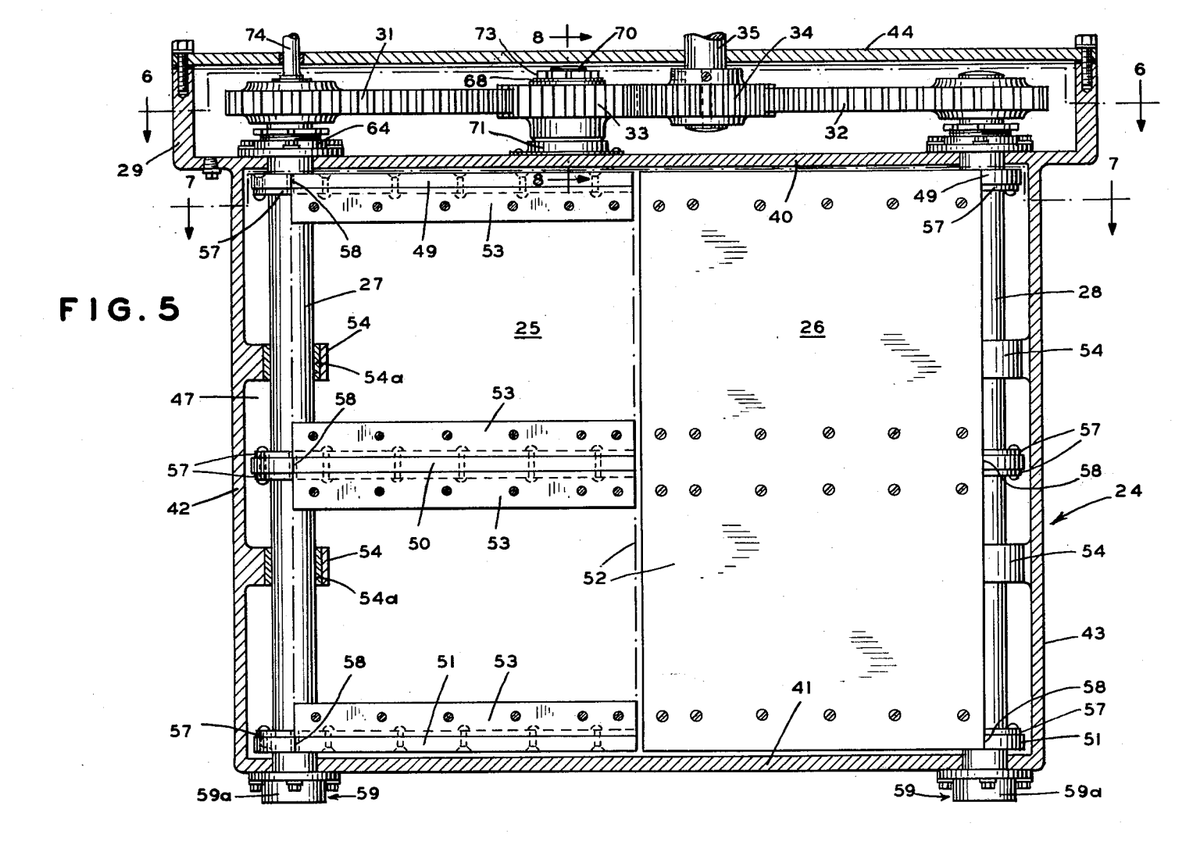
FIG. 5 is a vertical section, taken on the line 5—5 of FIG. 7, looking downstream. This figure illustrates the hinge mounting of the swing gates, and the drive gears.
Figure 6:
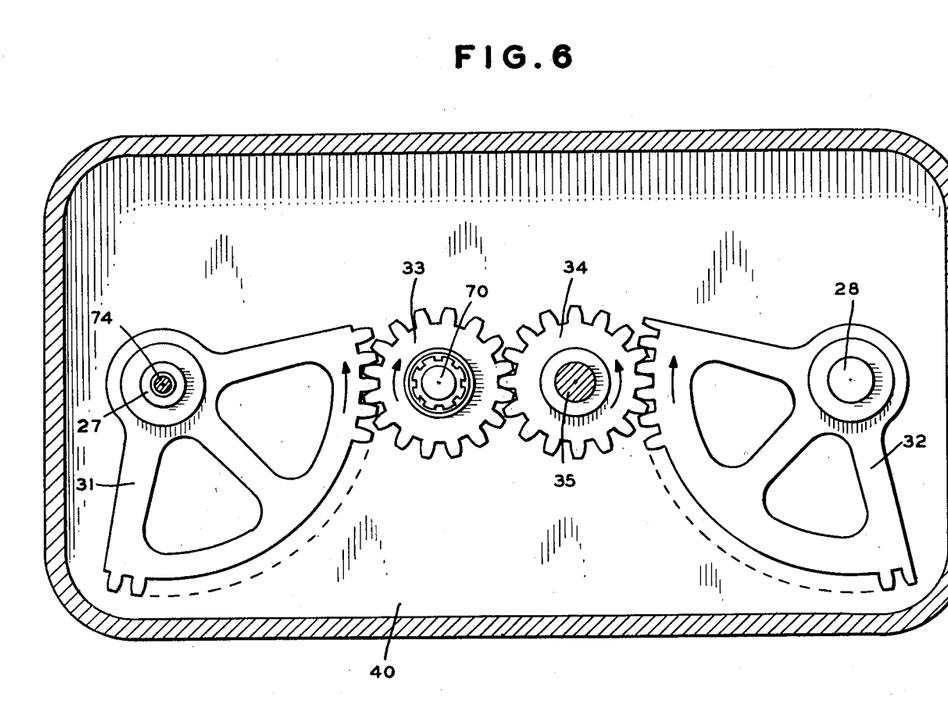
FIG. 6 is a plan section, taken on the line 6—6 of FIG. 5, illustrating the drive gears.

The gates are moved by a series of gears shown in FIGS. 5 and 6. These gears include sector gears 31, 32 mounted on shafts 27, 28 respectively. Sector gears 31, 32 mesh with idler gear 33 and drive gear 34. The latter is driven by drive shaft 35 from a gear reducer 36 which is driven by reversible electric motor 37 as shown in FIG. 2.

The suction valve 19 will now be described more in detail.

As shown in FIG. 5, the casing 24 is of generally rectangular cross-section. It comprises flat top and bottom walls 40, 41 and generally flat upright side walls 42, 43. The top wall 40 forms part of a gear box 29 having a removable top plate 44. The gear box 29 contains the several gears for driving the gates described more in detail below.

Figure 3:
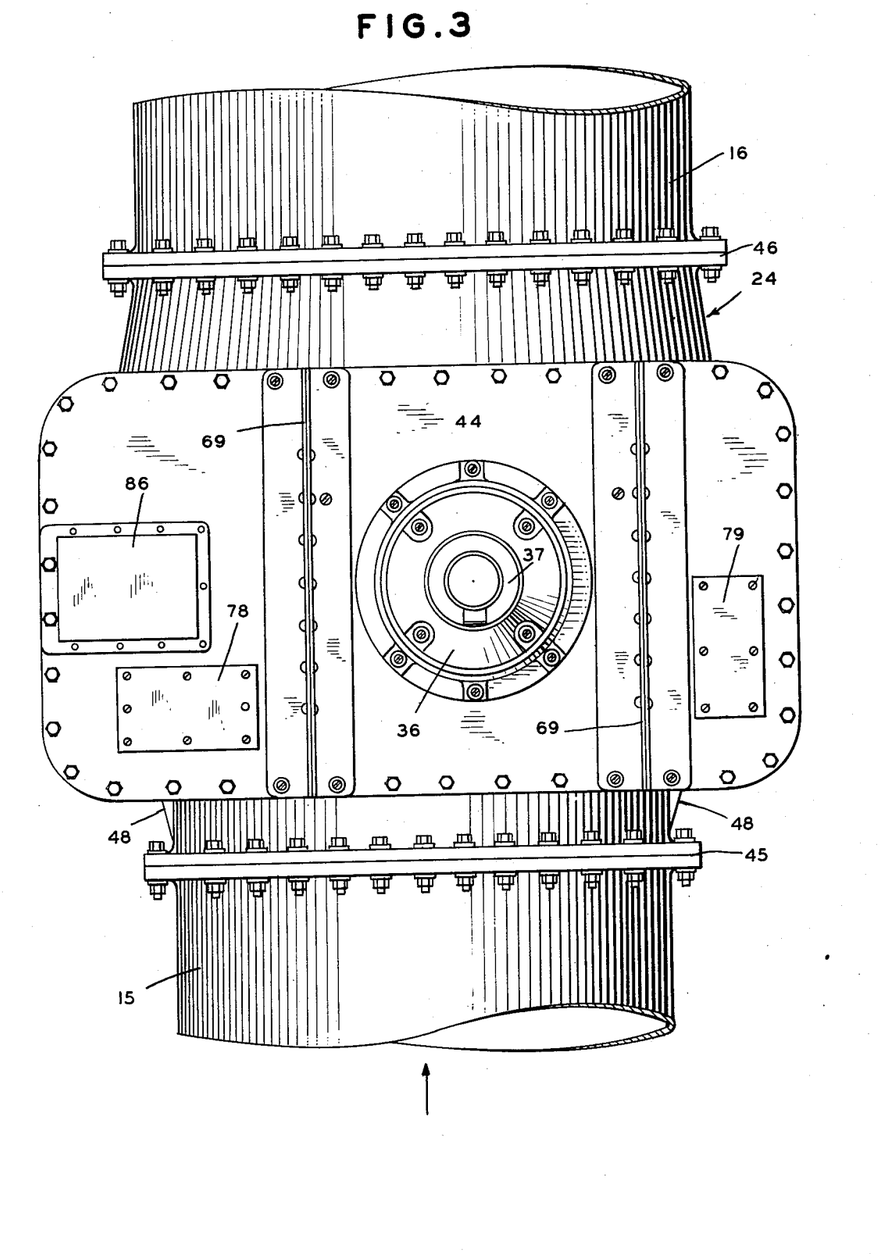
FIG. 3 is a top plan view of the suction valve of the invention.
Figure 4:
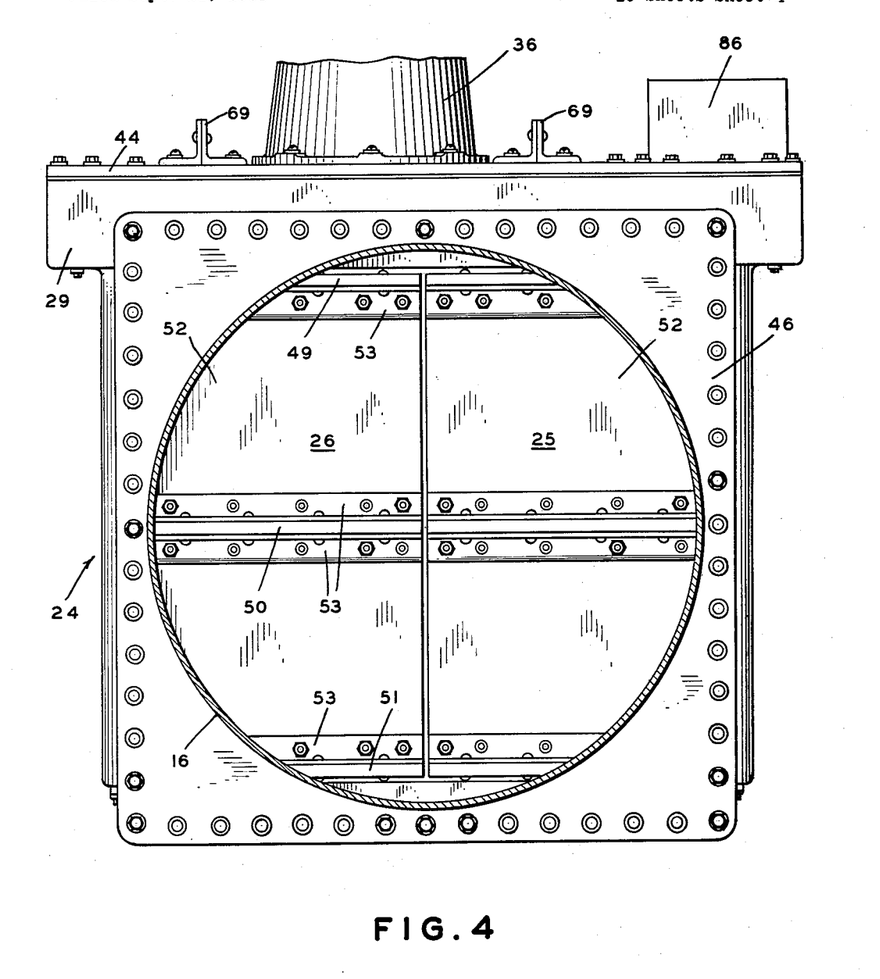
FIG. 4 is a vertical section, taken on the line 4—4 of FIG. 1, showing the exit flange of the valve and looking upstream toward the sintering pan.

As shown in FIG. 3, the casing 24 is connected at its entrance end by a flange coupling 45 to pipe 15 and it is connected at its exit end by flange coupling 46 to pipe 16.

Figure 7:
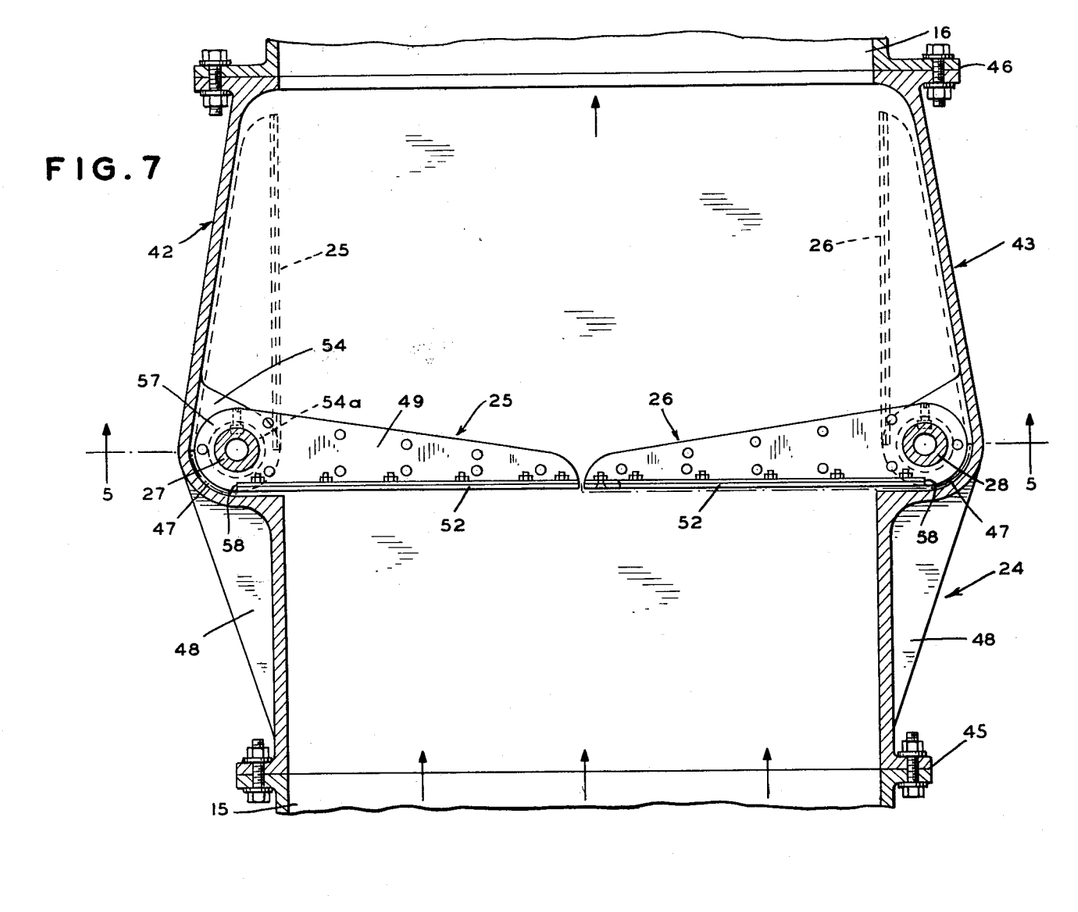
FIG. 7 is a plan section, taken on the line 7—7 of FIG. 5, illustrating the swing gates.

As shown in FIG. 7, the vertical side walls 42, 43 have recessed pockets 47 to house the gate shafts, and the gates themselves when in full open position, as indicated by the dotted outlines. The gates 25, 26 thus offer no obstruction to the gas flow when in full open position. The walls 42, 43 also have a series of horizontal ribs 48 for strengthening.

The gates 25, 26 are of similar construction except that one is substantially a mirror image of the other. Only one will be described in detail but the description will apply to both gates.

As shown in FIG. 5, each gate is made up of an upper bar 49, a middle bar 50 and a lower bar 51. The bars have angle members, denoted generally by 53, secured thereto. The middle bar 50 has upper and lower angle members 53 attached thereto. The upper bar 49 has an angle member 53 attached to its lower surface and the lower bar 51 has an angle member 53 attached to its upper surface. A gate plate 52 is attached to the several angle members and extends flush with the upper edge of the upper bar 49 and the lower edge of the lower bar 51.

The bars 49, 50, 51 have eyes through which the gate shaft 27 passes. The angle members 53 have extended webs 57 surrounding the shaft 27. The bars are suitably keyed to the shaft 27. The bars are recessed at 58 (FIG. 7) to seat the gate plate 52. The plate extends well behind the pocket 47 as indicated at recess 58 in FIG. 7.

The manner of hinging the gates will now be described.

As shown, more particularly in FIGS. 5 and 7, the vertical wall 42 is provided with intermediate brackets 54 located in the pocket 47. The hollow vertical shaft 27 is journaled in bearings 54a in brackets 54, and also in upper bearing 64 and in lower bearing 59, as described below.

Figures 8, 9, 10:
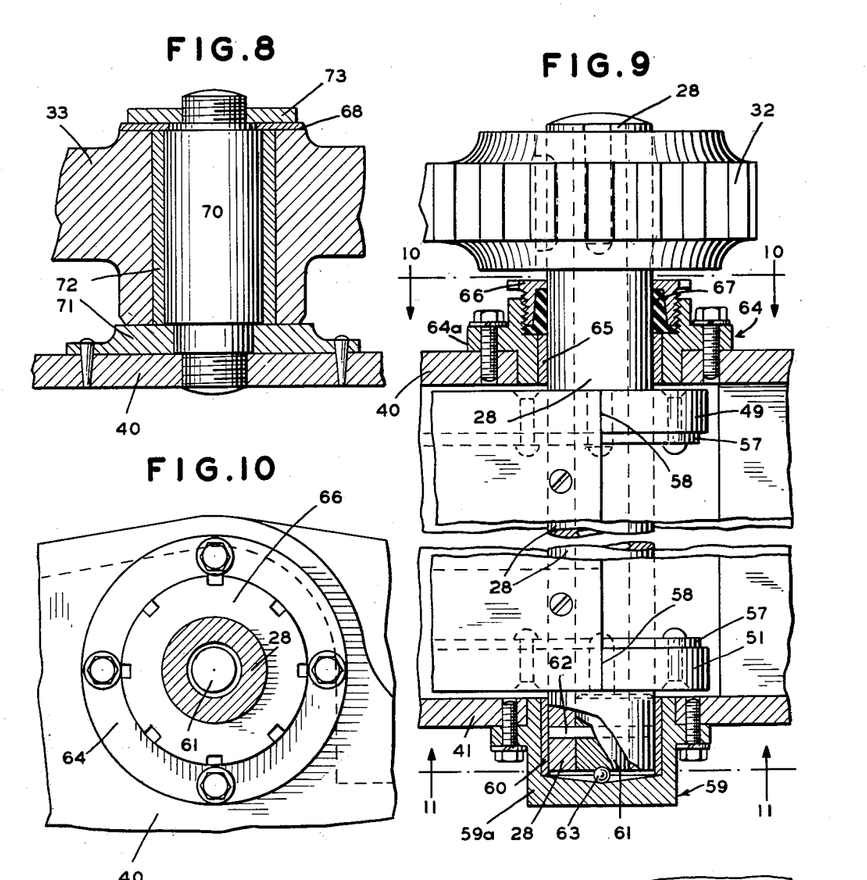
FIG. 8 is a detail section, taken on the line 8—8 of FIG. 5 illustrating the bearing for the idler gear.
FIG. 9 is an elevation, with parts broken away, showing the construction of one of the gate shafts and its bearings.
FIG. 10 is a plan section, taken on the line 10—10 of FIG. 9, illustrating the upper bearing of a gate shaft.
Figure 11:
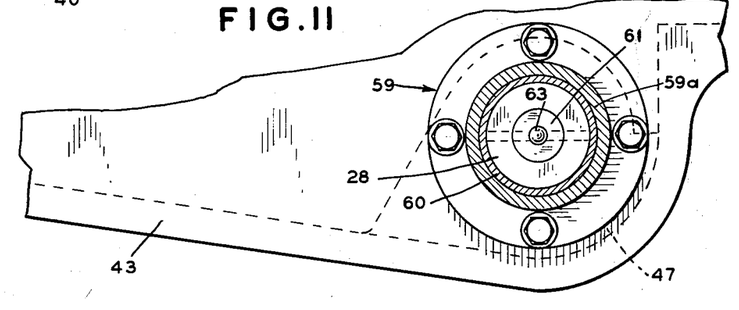
FIG. 11 is a section, taken on the line 11—11 of FIG. 9, illustrating the construction of the lower bearing of a gate shaft.

Referring now to FIGS. 9 and 11, the lower bearing 59 comprises a cap 59a bolted to the lower wall 41. The cap has a bushing 60 journaling the lower end of shaft 28. Hollow shaft 28 has a plug 61 held in position by pin 62. To take the end thrust, due to the weight of the gate, a ball 63 fits in a spherical recess in plug 61 and in a shallow conical recess in the bottom of cap 59a.

Referring to FIGS. 9 and 10, the upper bearing 64 comprises a collar 64a bolted to the upper wall 40 and having a bushing 65. A gland 66 is screw-threaded in collar 64a to hold packing 67 which seals the shaft.

The gear drive will now be described.

Referring to FIGS. 5, 6 and 8, the idler gear 33 is journaled on a stub shaft 70 threaded into the top wall 40 with a thrust plate 71 interposed. Plate 71 is secured to top plate 40 by fastening devices as indicated. Gear 33 has bushing 72 and a top washer 68. A nut 73 is threaded on shaft 70 and is tightened down against a shoulder on the shaft 70.

The gear reducer 36 (FIG. 2) may be of any desired construction so long as it has proper gear ratio and an irreversible set of gears such as a worm and a worm wheel. The gear reducer 36 is bolted to cover plate 44. It has a depending output shaft 35, supporting drive gear 34. Drive gear 34 (FIG. 6) meshes sector gear 32 and idler gear 33; the latter meshes sector gear 31.

It will thus be seen that, when drive shaft 35 is rotated in the direction of the arrow in FIG. 6, the other gears will rotate in the direction of the arrows as indicated, to open the gates 25, 26. When the gears are in the position shown in FIG. 6, the gates are fully closed.

Located on top of the casing of gear reducer 36 (FIG. 2) is electric motor 37. The details of the drive between motor 37 and the detail of the gear reducer 36 form no part of the present invention and hence it is not necessary to describe them.

The top plate 44 of gear box 29 has hand holes covered by removable cover plates 78, 79 (FIG. 3) for the purpose of inspecting the gears and for lubricating them. If desired, the gear box 29 may be completely filled with suitable lubricant. Suitable lubricant fittings (not shown) may be provided for lubricating upper and lower shaft bearings 64 and 59. The intermediate bearings 54 may be of the self-lubricating type. The lubricant may be of any type that is able to withstand the elevated temperature. The top plate 44 is also provided with strengthening strips 69.

Figure 12:
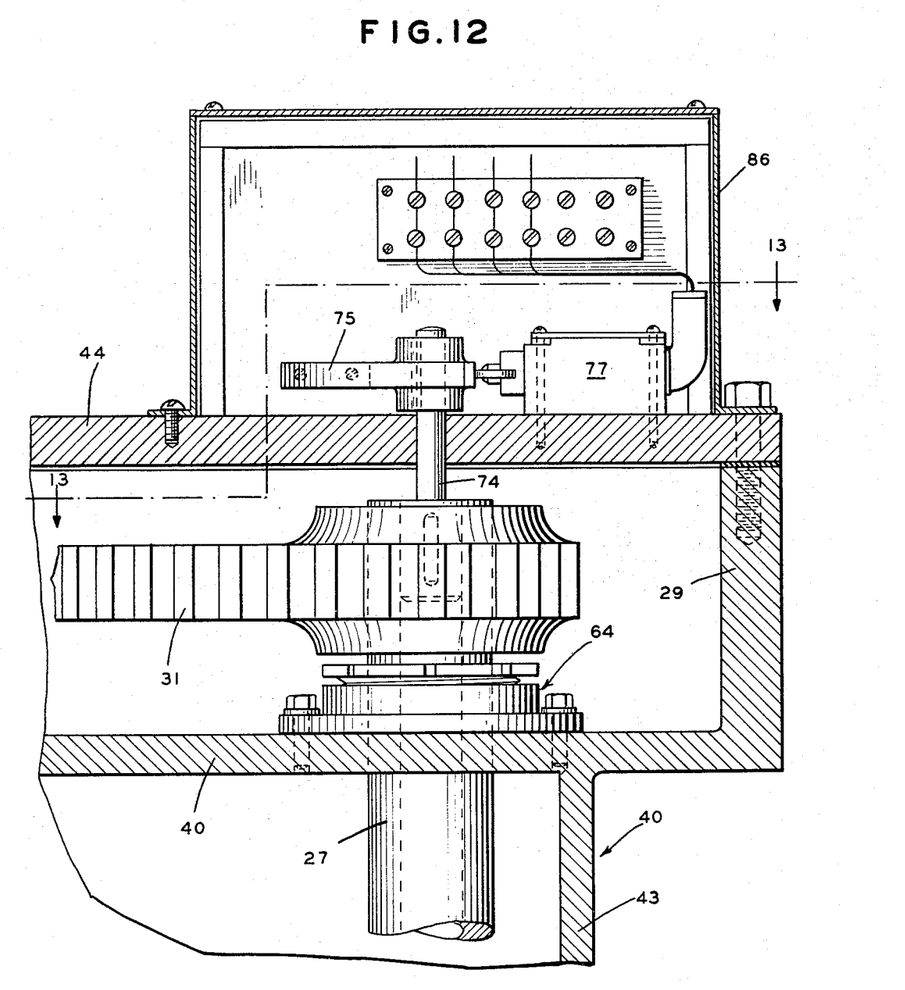
FIG. 12 is a section through the upper corner of the gear box, illustrating a limit switch.
Figure 13:
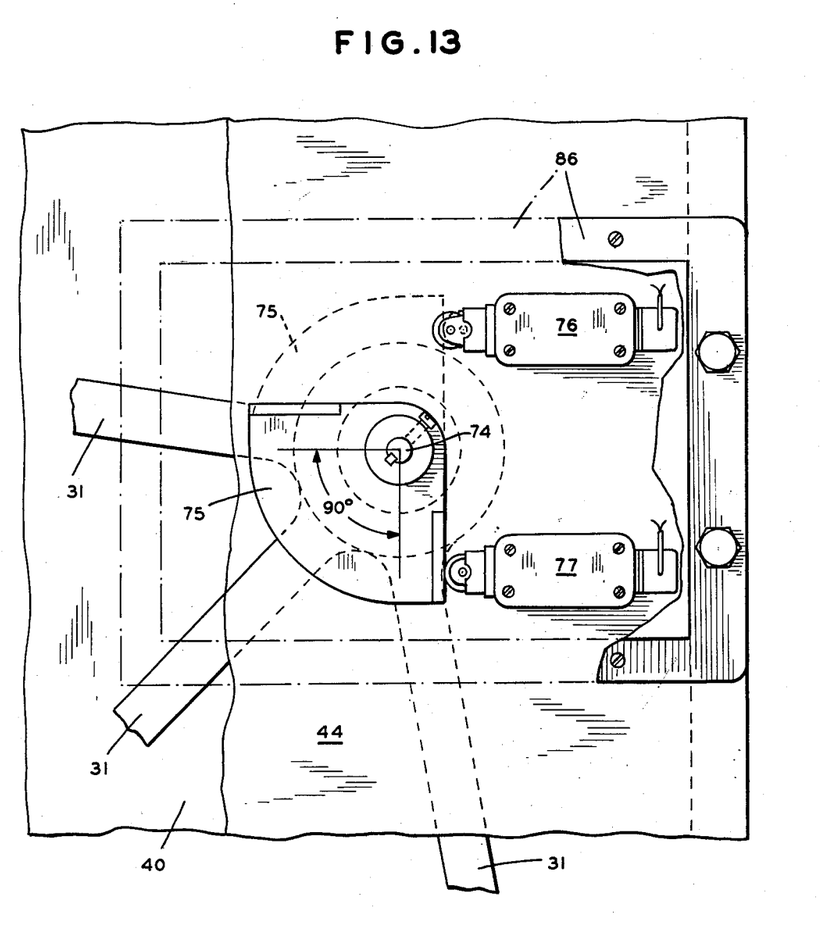
FIG. 13 is a plan section, taken on the line 13—13 of FIG. 12, illustrating the limit switch control.

Referring to FIGS. 5, 12 and 13, for automatically stopping the motor 37 when the gates 25, 26 reach full open and full closed position, automatic limiting devices are provided. These are enclosed in cover 86. For this purpose gate shaft 27 is provided with a shaft extension 74 (FIG. 12) which passes through cover plate 44 (see also FIG. 5). Shaft 74 carries a cam 75 suitably keyed thereto.

In FIG. 13 cam 75 is shown engaged against limit switch 77 with the sector gear 31 in full open position. When cam 75 rotates 90°, to correspond with movement of the sector gear and gates to full closed position, cam 75 engages limit switch 76 to automatically stop the motor.

It will be understood that suitable push buttons or other switch devices (not shown) may be provided for driving motor 37 in one direction to open the gates of the suction valve and in a reverse direction to close the gates. Such switch devices may be closed by an attendant to drive the motor in the desired direction. To stop the motor when the gates are in any desired position, the attendant opens the switch devices. The gates will stay in any adjusted position by the action of the irreversible gear reducer 36.

In the event the switch devices are held closed too long, engagement of the limit switches 76 or 77 by cam 75 automatically removes power from the motor 37 to stop the motor with the gates either in full open or full closed position.

If desired, suitable signal devices (not shown) may be provided to inform the attendant the exact position of the gates. For example, the signal devices may take the form of a pointer or of different colored lamps. Lighting of an appropriate lamp may indicate fully closed position, one-quarter open position, one-half open position, three-quarters open position, and full open position.

The suction valve may be built of any materials necessary to impart strength at the elevated temperatures. The casing 24 may be built of cast steel or cast iron or welded plate. The hollow shafts 27, 28 may be made of steel. The interior of the valve casing, the gates and all parts exposed to the hot sinter gases may be sprayed with a special alloy, for example, 80 carbon steel, to protect the surface and to resist any abrasion caused by flow of the gases at high velocity.

The valve may be "inched" open and closed to place the gates at any position between fully closed and fully opened and held in that position so as to variably control the amount of suction impressed on the sintering machine. The control switches and signal devices may be placed at any desired location in the plant.

The location of the gate shafts at the sides of the casing leaves the valve passage entirely free of any obstructions when the valve is fully open. The gates open in the direction of gas flow through the valve.

While certain novel features of the invention have been disclosed herein, and are pointed out in the annexed claims, it will be understood that various omissions, substitutions and changes may be made by those skilled in the art without departing from the spirit of the invention.

What is claimed is:

1. A suction valve for a sintering plant having a pan, a suction-blower, a conduit connecting said pan with said valve through which hot gases from said pan are carried and a conduit connecting said valve with said suction-blower; said suction-valve comprising: a casing substantially rectangular in cross-section having a top wall, a bottom wall, and upstanding side walls providing a flow passage through said valve for said hot gases from said sintering pan, each of said side walls having a vertically extending recessed pocket, a vertically disposed shaft in the upstream side of each of said pockets with the upper end portion of each shaft extending upwardly through said top wall, bearings mounting the upper and lower end portions of said shafts for rotation of said shafts about their vertical axes, a swingable gate fixedly mounted on each of said shafts, said pockets being sufficiently large to receive said gates when said gates are swung on their respective shafts downstream toward said suction-blower to full open position so as to leave said flow passage through the valve unobstructed, said gates being sufficiently large to close said flow passage through said valve when said gates are swung on their respective shafts upstream toward said sintering pan to full closed position, a sector gear fixedly mounted on the upper end portion of each of said shafts, an idler gear mounted for rotation and meshing with one of said sector gears, a rotatable drive gear meshing with said other sector gear and with said idler gear, gear-box side walls extending upwardly from said top wall of said casing and surrounding said gears, said top wall of said casing with said gear-box side walls providing a gear-box for holding lubricant for lubricating said gears, a cover closing said gear-box and power driven means mounted above said cover including a reversible speed reducer having a driven rotatable shaft, the outer end of which extends vertically through said cover and having said drive gear secured thereto and a reversible electrically driven motor connected to drive said gear reducer adapted for rotating said drive gear selectively in a clockwise and counter-clockwise angular direction and causing said gates to swing selectively toward open and closed positions in response to rotation of said drive gear, a pair of spaced limit switches mounted on said cover and a cam connected to rotate in response to rotation of one of said gate shafts, said cam being mounted above said cover and being engageable with one of said limit switches when said gates are swung to full open position and engageable with the other of said limit switches when said gates are swung to full closed position for automatically stopping said electric motor when said gates reach full open and full closed position.

2. A suction valve constructed according to claim 1 having spaced intermediate bearings between said bearings mounted at the upper and lower end portions of said gate shafts in which said gate shafts are journaled, said intermediate bearings being journal bearings supported by the side walls of said casing.

3. A suction valve constructed according to claim 2 in which said bearings at the lower end portions of said gate shafts are journal bearings and the lower ends of said gate shafts are supported on thrust bearings in turn supported by the bottom wall of said casing and the bearings at the upper end portions of said gate shafts are journal bearings supported by the top wall of said casing.

4. A suction valve constructed according to claim 3 in which each of said swingable gates comprises spaced horizontally disposed structural bar members, having reinforced inner ends having eyes therein through which the gate shaft extends and a gate plate secured to said structural bar members throughout the lengths of said horizontally disposed bar members, said bar members being recessed to provide a seat for said gate plate.

References Cited by the Examiner
UNITED STATES PATENTS

| | | | |
|---|---|---|---|
| 649,999 | 4/00 | Klawon | 251—248 XR |
| 1,474,859 | 11/23 | Swart | 266—21 |
| 2,284,396 | 5/42 | Pfeiffer | 251—212 |
| 2,313,127 | 3/43 | Sprague | 251—1 XR |
| 2,375,432 | 5/45 | Miller et al. | 251—212 XR |
| 2,390,150 | 12/45 | Johnson et al. | 251—212 XR |
| 2,393,482 | 1/46 | Smith | 251—133 XR |
| 2,527,310 | 10/50 | Kelsey | 266—21 |
| 2,721,678 | 10/55 | Gill | 251—212 XR |
| 2,790,461 | 4/57 | Lightfoot et al. | 251—248 XR |
| 2,956,582 | 10/60 | Pranter | 251—212 XR |

MARTIN P. SCHWADRON, *Acting Primary Examiner.*
RAYMOND K. WINDHAM, *Examiner.*